June 8, 1943. C. S. DRAPER Re. 22,330

TURN INDICATOR

Original Filed April 19, 1940 2 Sheets-Sheet 1

INVENTOR
CHARLES S. DRAPER,
BY Herbert H. Thompson
his ATTORNEY

June 8, 1943. C. S. DRAPER Re. 22,330

TURN INDICATOR

Original Filed April 19, 1940 2 Sheets-Sheet 2

INVENTOR
CHARLES S. DRAPER,
BY
Herbert H. Thompson
his ATTORNEY.

Reissued June 8, 1943

Re. 22,330

UNITED STATES PATENT OFFICE 22,330

TURN INDICATOR

Charles S. Draper, Newton, Mass., assignor to Sperry Gyroscope Company, Inc., Brooklyn, N. Y., a corporation of New York Original No. 2,291,612, dated August 4, 1942, Serial No. 330,481, April 19, 1940. Application for reissue March 15, 1943, Serial No. 479,299

23 Claims. (Cl. 33—204)

This invention relates to two-degree of freedom gyroscopes, such as widely employed to indicate the rate of turn of the vehicles on which they are mounted or, in fact, the rate of angular motion around any axis, such as rate of roll or rate of pitch as well as rate of turn. Such gyroscopes have only one pivotal axis besides the axis of spin and it is the principal object of this invention to improve the form of bearing employed for this axis. The present practice is to provide ball bearings for this axis and to employ, in addition, coil tension springs for opposing the precession of the gyro so that the amount of precession from the neutral position is approximately proportional to the rate of turn.

According to my invention, I propose to replace both the tension coil springs and the ball bearings by a new form of pivotal support which performs the function of both the bearings and the springs in a superior manner, and which is cheaper to manufacture and will stand up better under vibration and rough usage. According to my invention, I provide a precession axis for the turn gyroscope by supporting the horizontal trunnions at both ends solely by spring means which not only pivotally support the gyroscope for precession about this axis, but also provide the yielding centralizing means for which purpose it was previously necessary to provide separate springs. Applicant's spring means may comprise a plurality of relatively stiff, flat springs symmetrically arranged around and spaced from each trunnion, and anchored at their outer ends to the casing with their inner or free ends connected to said trunnions by radially extending members which may also be in the form of flat springs of greater flexibility. In addition, with my form of spring the amount of precession of the gyroscope is more nearly proportional to the rate of turn through large angles.

A further object achieved by my invention is the improvement of the damping means employed for rate of turn gyroscopes, by which the damping means not only strongly damps the precession of the gyroscope, but also suppresses vibration of the spring-supported rotor bearing frame in any direction and acts as a cushion to prevent vibrations of the support from reaching the gyroscope.

Referred to the drawings, showing the preferred form of my invention:

Figure 1:
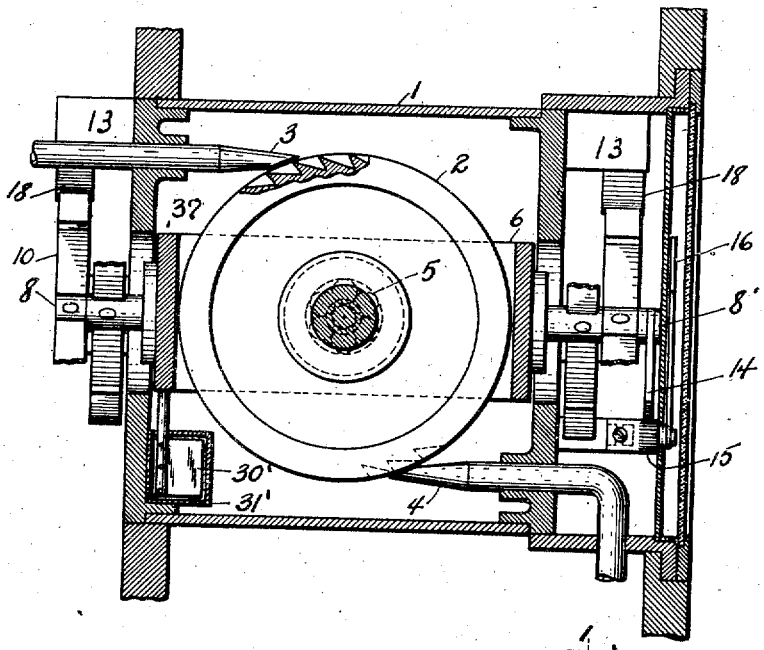
Fig. 1 is a vertical section through a rate of turn gyroscope with my improved pivotal support therefor.
Figure 2:
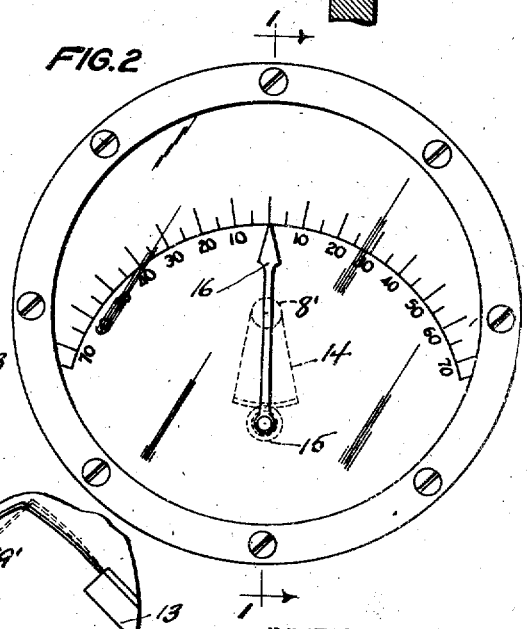
Fig. 2 is a face view of the same.

The angular rate gyroscope shown in Fig. 1 is shown as mounted within a casing 1. The gyro rotor 2 is shown as air spun, as by means of nozzles 3 and 4. The rotor is shown as journaled in normally horizontal ball bearings 5 within the rotor bearing ring or frame 6, which in turn is journaled on a horizontal axis at right angles to the spin axis. I provide freedom about said horizontal axis by supporting the ring 6 by means of a plurality of relatively stiff flat springs 11, 11′, 12, 12′ symmetrically arranged around each trunnion 8, 8′ and connected to the trunnion by radially extending portions 9, 10, which may also be in the form of flat springs which, however, are much thinner and more flexible than the springs 11, 11′, 12, 12′. Springs 9 and 10 are shown as extending substantially at right angles to the springs 11, 11′, 12 and 12′ and are shown as fastened through slots in the trunnions 8, 8′, in which they are tightly clamped at their center. At their outer ends, members 9 and 10 are tightly clamped to the free ends of the springs 11, 11′, 12, 12′, which are shown as bent at an angle for this purpose. Metal clamps or clips 40 may be used to bind the springs together at this point. The outer ends of the springs 11, 11′, 12 and 12′ are tightly clamped in brackets 13 secured to or projecting from the case. Preferably, also, these springs are placed under slight bending stress so as to place the springs or tension members 9 and 10 under tension to support the weight of the gyro assembly against jolts and jars in any direction. This is illustrated by showing a slight convex bow in the springs 11, 11′, 12, 12′, which exert the major portion of the centralizing force on the gyroscope. In order to damp out up-and-down and lateral vibrations of the system, I preferably enclose the springs 11, 11′, 12, 12′ with sleeves 18 of some suitable damping material such as an oil soaked sponge, soft felt, viscose or the like, which act as effective dampers. Damping of the precessional movements of the gyroscope may be accomplished by some form of dash pot or other liquid damper, such as a bladed arm 30′ secured to ring 6 which dips into a small liquid container 31′ on the interior of casing 1.

The trunnion 8′ is also shown as having a gear segment 14 secured thereto, which drives a pinion 15 on precession of the gyroscope to rotate the indicator pointer 16 through preferably a larger angle than the angle of precession, thus giving a magnified movement to the pointer.

Figure 3:
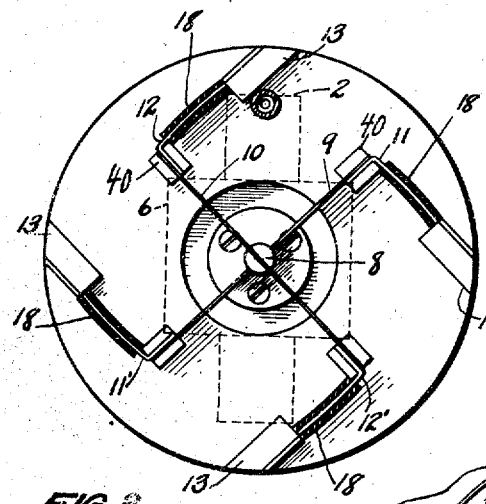
Fig. 3 is a rear elevation of the same.
Figure 4:
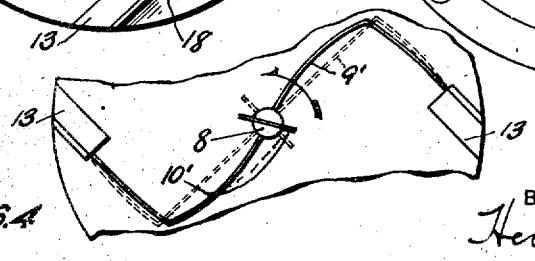
Fig. 4 is a diagram showing the deflection of the springs caused by precession of the gyro and also showing a slightly modified form of the invention.

The operation of the springs during precession is indicated diagrammatically in Fig. 4. In this figure, the dotted line position is the same as shown in Fig. 3 with the gyro in its neutral or central position. The full lines indicate the form assumed by the springs when the gyro precesses in a counterclockwise direction through a small angle. At first the upper portion of the springs 9 and 10 are bowed to the left and the lower portion to the right, with the result that the precession of the gyroscope is thus yieldingly opposed by this weak bending force. As the precession increases, an increasing inward pull is exerted on the ends of the stiff springs 11, 11', 12, 12', which exert the major portion of the centralizing force on the gyroscope, thus pulling them inwardly into the full line position. This results in an increased yielding force opposing the precession. By calculation and experimentation I have found that the forces thus secured give a more uniform precession of the gyro for increasing rates of turn than do the simple coil springs of the prior art, partly because the amount of precession against a uniform spring is not constant due to the fact that as the gyro precesses through large angles, its spin axis becomes more and more coincident with the axis of turn, resulting in a decrease in the precession force developed.

In addition to this advantage is the fact that I have eliminated entirely the usual ball bearing pivots about the precession axis, eliminating the troubles therewith due to wear and imperfections of the balls, and also static friction incident to all bearings.

It is obvious that my invention may assume many forms. For instance, instead of making the springs 9, 11 and 11' and 10, 12 and 12' in three pieces each, each set may be formed of one piece merely by bending each spring through a substantial angle at intermediate points between its mid point and both ends to form elbow portions clamped at their free ends by brackets 13 to casing 1 as shown in Fig. 4 and, if desired, giving the end portions of each spring a different temper from the middle portion to provide a greater stiffness in the end portions.

Figs. 5 to 10, inclusive, show further modifications of my invention. In this form, only one spinning jet 3' is shown, the air jet engaging the wheel near the horizontal axis of precession 8—8'. In this form also, improved damping means are provided for oscillations or vibratory movements of the gyroscopic system in all planes, namely, damping means for rotational and linear oscillations and vibrations in all planes.

Figure 5:
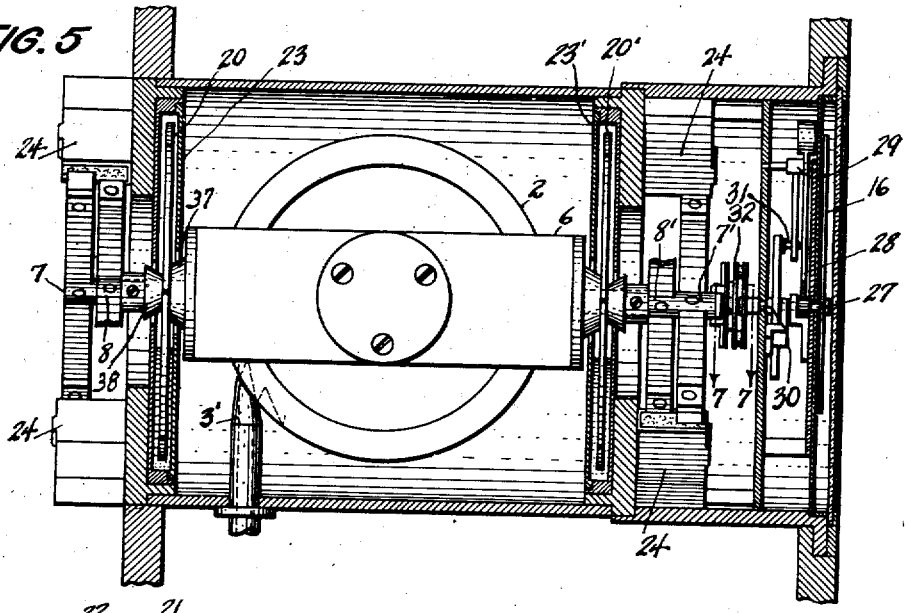
Fig. 5 is a vertical section through a modified form of rate gyroscope.
Figure 6:
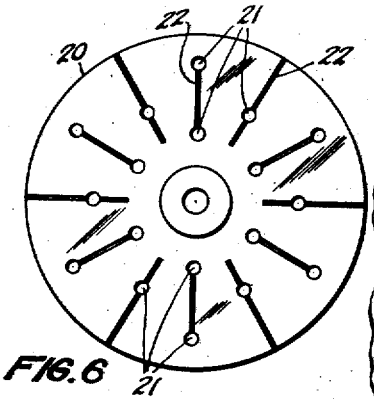
Fig. 6 is a face view of one of the damping discs used thereon.

To damp the precession of the gyroscope, I have shown secured at least to one trunnion 8, and preferably to both trunnions 8 and 8', a thin disc 20 of sheet metal which is preferably provided with a plurality of holes 21 and connected slots 22. Each disc is shown as enclosed in a stationary casing 23 in which oil is placed to a level preferably somewhat below that of the axis 8—8'. Precession of the gyroscope will therefore be resisted by the liquid drag on the disc while the holes and slots in the disc tend to prevent any sticking of the disc against the walls of the container by preventing the formation of a seal. As shown in Fig. 5, clearance is allowed between the trunnions 8 and 8' and the casings 23 and 23' and escape of oil is avoided by providing the trunnions where they extend through the casings with conical-shaped collars 37 and 38 so that any oil that may get above the trunnion will drain back into the lower portion of the casings. This form of damper also assists in preventing endwise translation or sudden displacement of frame 6 in casing 1, since the flat discs oppose and strongly damp sudden relative displacements of this character.

For damping translatory vibrations of the trunnions, i. e., up-and-down and lateral, I have in this instance used metal U-shaped pieces 24 fixed to the housing, having therein a piece or pieces of soft felt, viscose or the like, 25, which are held against two sides of the laterally extending portions 11 and 12 of the spring supports. When such material is soaked in oil, it provides an excellent damper for suppressing linear vibrations.

Figure 9:
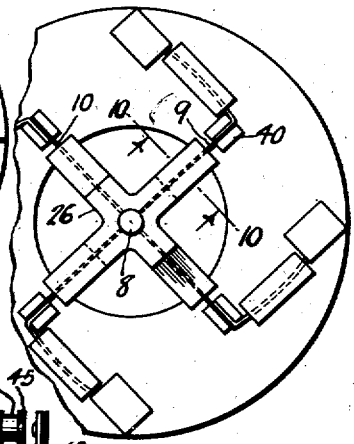
Fig. 9 is a similar view showing a still different form of damper.
Figure 8:
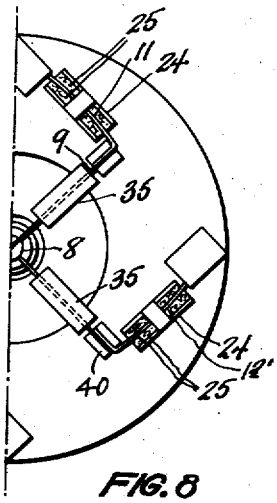
Fig. 8 is an end elevation showing an improved form of damper on the leaf springs.
Figure 10:
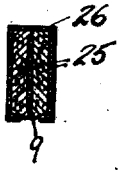
Fig. 10 is a sectional detail taken on line 10—10 of Fig. 9.

For suppressing rotary vibrations or quick period oscillations, I have shown a sheet metal frame 26 in the form of a cross, the ends of which are folded over to enclose similar pieces 25' of soft material to enclose a portion of the radial springs 9 and 10 (see Figs. 9 and 10). The cross frame 26 is loosely mounted on the shaft 8' so as not to oppose its rotation, but to merely suppress vibrations causing bending of the strips 9 and 10. The same purpose is accomplished in Fig. 8 by blocks 35 similar to 24 but unconnected to the casing so that they suppress only bending of the strips.

Figure 7:
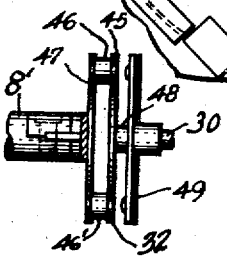
Fig. 7 is a sectional detail taken approximately on line 7—7 of Fig. 5 and showing the universal coupling between the gyroscope and pointer.

In this case, I have shown the pointer or other indicator 16 mounted on a shaft 27, which is rotated from a gear sector 28 secured to a small cross shaft 29. The shaft 29, in turn, is rotated from a shaft 30 coaxial with shaft 27 and trunnion 8' by means of a pin and slot connection 31. The shaft 30, in turn, is journaled independently of the trunnion 8' and has a universal connection 32 thereto so that the radial movements of the trunnion 8' will not place any load on the bearings of the shaft 30. As shown in Fig. 7, said universal connection may be in the form of a central thin flexible ring 45 secured by two spaced rivets 46 and 46' to a first ring 47 and secured by two spaced rivets 48 on the other side thereof and spaced 90° from said other rivets to a third ring 49. The gyro trunnion 6' is shown as secured to the first ring 47 while the shaft 30 is secured to ring 49. Thus, a limited universal connection is provided between the trunnion and shaft. The pointer 16 is thus independently mounted from the gyroscope and at the same time its movement is greatly magnified. In this way, the gyroscope may be restrained to comparatively small precession angles without sacrificing the large scale movement of the pointer. Since the accuracy of the gyroscope dimishes when it precesses through a large angle, I achieve in this manner a more accurate indication of rate of turn through a wider range than possible in the present types of rate of turn indicators.

As many changes could be made in the above construction and many apparently widely different embodiments of this invention could be made without departing from the scope thereof. It is intended that all matters contained in the above description or shown in the accompanying drawings shall be interpreted as illustrative and not in a limiting sense.

Having described my invention, what I claim and desire to secure by Letters Patent is:

1. In an angular rate gyroscope, a rotor, a bearing frame within which said rotor is mounted for spinning about an axis an outer casing, and means for pivotally mounting said frame in said casing for precession about a second axis, including a leaf spring extending in both directions from said frame and clamping means for securing the outer ends of said spring to said casing for both pivotally supporting the frame and yieldingly opposing the precession of the gyroscope in either direction from its normal position.

2. An angular rate gyroscope as claimed in claim 1, in which said spring means includes a flat spring clamped at its mid point to said frame, bent at a substantial angle at a point between said mid point and its ends and clamped at both ends to said casing.

3. An angular rate gyroscope comprising an outer casing, a flat spring member adjacent each end of said casing secured at both ends to the interior thereof and having the middle portion of each extending radially across the casing, and a precession trunnion of the gyroscope adjacent each end of the casing to which the mid portion of said spring is clamped, said spring serving both to support said trunnion and provide yielding centralizing means therefor.

4. An angular rate gyroscope comprising an outer casing, a pair of flat spring members adjacent each end of said casing secured at the outer ends to the interior thereof, a member of each pair being bent substantially at right angles at its inner end, and a second or connecting member of lesser stiffness secured to the adjacent frame of the gyroscope at a mid point and at both ends to the inner end of said first named pair, said members serving both to support said gyroscope about its precession axis and to provide yielding centralizing means therefor.

5. In an angular rate gyroscope, a rotor, a bearing frame within which said rotor is mounted for spinning about an axis, an outer casing, means for pivotally mounting said frame in said casing for precession about a second axis without a bearing, comprising only a plurality of springs extending between said frame and said casing in a plurality of directions for both pivotally supporting and guiding the frame and yieldingly opposing the precession of the gyroscope in either direction from its normal position, and damping means engaging said spring means for suppressing vibrations of the gyroscope.

6. In an angular rate gyroscope, a rotor, a bearing frame within which said rotor is mounted for spinning about an axis, an outer casing, means for pivotally mounting said frame in said casing for precession about a second axis without a bearing, comprising only a plurality of springs extending between said frame and said casing in a plurality of directions for both pivotally supporting and guiding the frame and yieldingly opposing the precession of the gyroscope in either direction from its normal position, and liquid damping means acting about the precession axis for suppressing precession.

7. An angular rate gyroscope comprising an outer casing, a pair of flat spring members adjacent each end of said casing secured at their outer ends to the interior of said casing, a member of each pair being bent substantially at right angles at its inner end, a second flat spring member of lesser stiffness secured to the adjacent frame of the gyroscope at a mid point of said second spring, each end of said second spring being secured to an inner end of one of said first named pair respectively, said springs serving both to support said gyroscope about its precession axis and to provide yielding centralizing means therefor, and damping material clamped on each spring member to suppress both oscillatory and translatory vibrations.

8. An angular rate gyroscope comprising an outer hollow casing, a flat spring member adjacent each end of said casing secured at both ends to the interior of said casing and having the middle portion of each extending radially across the casing, a precession trunnion of the gyroscope adjacent each end of the casing to which the mid portions of said springs are respectively clamped, said spring serving both to support said trunnion and provide yielding centralizing means therefor, and a rotatable indicator pivoted independently of said gyroscope and connected thereto by multiplying gearing for showing the rate of turn.

9. In an angular rate gyroscope, a rotor, a bearing frame within which said rotor is mounted for spinning about an axis, an outer casing, means for pivotally mounting said frame in said casing for precession about a second axis without a bearing including spring means extending between said frame and said casing for both pivotally supporting the frame and yieldingly opposing the precession of the gyroscope in either direction from its normal position, a rotatable indicator pivoted independently of said gyroscope, an independently pivoted shaft, a universal joint connected between said second shaft and said gyroscope and multiplying gearing between said shaft and said pointer.

10. In an angular rate gyroscope, a rotor, a bearing frame within which said rotor is mounted for spinning about an axis, an outer casing, and means for pivotally mounting said frame in said casing for precession about a second axis at an angle to said axis of spin, including a plurality of symmetrically arranged leaf springs extending between said frame and said casing for both pivotally supporting the frame and yieldingly opposing the precession of the gyroscope in either direction from its normal position.

11. An angular rate gyroscope comprising an outer casing, a plurality of symmetrically arranged members including flat springs adjacent at least one end of said casing, each member being secured at both ends to the interior of said casing and having its middle portion extending radially across the casing, and a precession trunnion of said gyroscope adjacent said end of the casing, to which the mid portions of said members are clamped, said members serving both to support said trunnion and provide yielding centralizing means therefor.

12. In an angular rate gyroscope, a rotor, a bearing frame within which said rotor is mounted for spinning about an axis, an outer casing, means for pivotally mounting said frame in said casing for precession about a second axis without a bearing, comprising only a plurality of springs extending between said frame and said casing in different directions for both pivotally supporting and guiding the frame and yieldingly opposing the precession of the gyroscope in either direction from its normal position, damping means for the precessional movements of said frame, and damping means for suppressing translatory vibrations of said frame within said casing.

13. In an angular rate gyroscope, a rotor, a bearing frame within which said rotor is mounted for spinning about an axis, an outer casing, means for pivotally mounting said frame in said casing for precession about a second axis without a bearing, comprising only a plurality of springs extending between said frame and said casing in different directions for both pivotally supporting and guiding the frame and yieldingly opposing the precession of the gyroscope in either direction from its normal position, a disc on said frame for turning therewith, and a closely fitting liquid container therefor secured to said casing whereby the precession is damped and endwise displacement suppressed.

14. In an angular rate gyroscope, a rotor, a bearing frame within which said rotor is mounted for spinning about an axis, an outer casing, means for pivotally mounting said frame in said casing for precession about a second axis without a bearing, comprising a plurality of springs extending between said frame and said casing in different directions for both pivotally supporting and guiding the frame and yieldingly opposing the precession of the gyroscope in either direction from its normal position, damping means for the precessional movements of said frame, damping means for suppressing translatory vibrations of said frame within said casing, a rotatable indicator pivoted independently of said gyroscope in said casing, and a universal connection between said indicator and gyroscope.

15. In an angular rate gyroscope, a rotor, a bearing frame within which said rotor is mounted for spinning about an axis, an outer casing, and means for pivotally mounting said frame in said casing for precession about a second axis, including laterally extending trunnions on said frame, a leaf spring clamped in each trunnion and extending radially therefrom and having an outer end bent at a substantial angle into said radially extending portion to form an elbow portion, and means clamping the outer end of each elbow to said casing.

16. In an angular rate gyroscope, a rotor, a bearing frame in which said rotor is mounted for spinning about an axis, trunnions on said bearing frame, and spring means both for pivotally supporting said frame for precession in said casing and for yieldingly opposing precession including a leaf spring clamped in a trunnion and extending radially therefrom and having its outer end bent at a substantial angle to form an elbow portion, and means clamping the outer end of said elbow portion to said casing, whereby precession is opposed both by flexing of said radial portion of the spring and by bending said elbow portion of said leaf spring.

17. An angular rate gyroscope as claimed in claim 16 wherein said leaf spring extends radially in both directions from said trunnions and has both ends bent laterally in opposite directions forming two elbows clamped to said casing.

18. In an angular rate gyroscope, a rotor, a bearing frame within which said rotor is mounted for spinning about an axis, an outer casing, and means for pivotally mounting said frame in said casing for precession about a second axis at an angle to said axis of spin, including a plurality of leaf springs placed symmetrically around said precession axis and connected at their outer portions to said casing and at the free portions to said frame for both pivotally supporting the frame and yieldingly opposing the precession of the gyroscope in either direction from its normal position.

19. In an angular rate gyroscope, a rotor, a bearing frame within which said rotor is mounted for spinning about an axis, an outer casing, means for pivotally mounting said frame in said casing for precession about a second axis without a bearing, comprising only a plurality of springs extending between said frame and said casing in different directions for both pivotally supporting and guiding the frame and yieldingly opposing the precession of the gyroscope in either direction from its normal position, a disc on said frame for turning therewith, a closely fitting liquid container therefor secured to said casing, and a viscous liquid filling the lower portion only of said container, whereby precession is damped and endwise displacements suppressed and the spilling of the liquid avoided.

20. An angular rate gyroscope as claimed in claim 18, wherein said elbow portion of said leaf spring is so clamped to the casing as to place said radially extending portion under tension.

21. In an angular rate gyroscope, a rotor, a bearing frame within which said rotor is mounted for spinning about an axis, an outer support, means for pivotally mounting said frame in said support for precession about a second axis without a bearing, comprising only spring means extending between said frame and said casing on each side of said frame for both pivotally supporting and guiding the frame and yieldingly opposing the precession of the gyroscope in either direction from its normal position, and damping means acting about said precession axis for both damping the precessional movements of said frame and suppressing relative vibrations of said frame and said support.

22. In an angular rate gyroscope, a rotor, a bearing frame within which said rotor is mounted for spinning about an axis, a support, means for pivotally mounting said frame in said support for precession about a second axis without a bearing, comprising only spring means extending between said frame and said casing on opposite sides of said frame for both pivotally supporting and guiding the frame and yieldingly opposing the precession of the gyroscope in either direction from its normal position, a disc on said frame for turning therewith, and a closely fitting liquid container therefor secured to said support, whereby the precession is damped and endwise displacement suppressed.

23. In an angular rate gyroscope, a rotor, a bearing frame within which said rotor is mounted for spinning about an axis, a support, means for pivotally mounting said frame in said support for precession about a second axis without a bearing, comprising only spring means extending between said frame and said casing on opposite sides of said frame for both pivotally supporting and guiding the frame and yieldingly opposing the precession of the gyroscope in either direction from its normal position, a disc on said frame for turning therewith, a closely fitting liquid container therefor secured to said casing, and a viscous liquid filling the lower portion only of said container, whereby precession is damped and vibrations absorbed between the frame and support and the spilling of liquid is avoided.

CHARLES S. DRAPER.